(12) United States Patent
Park et al.

(10) Patent No.: US 9,362,805 B2
(45) Date of Patent: Jun. 7, 2016

(54) STRUCTURE OF BRUSHLESS DIRECT CURRENT MOTOR HAVING DIRECT CONNECTION BETWEEN MAIN BODY AND CONTROLLER

(71) Applicants: Hyundai Motor Company, Seoul (KR); Kia Motors Corporation, Seoul (KR); DH Holdings Co. Ltd, Ulsan (KR)

(72) Inventors: Hoo-Sang Park, Hwasung-si (KR); Jong-Sang Noh, Ulsan (KR); Jong-Man Lee, Yangsan-si (KR)

(73) Assignees: HYUNDAI MOTOR COMPANY, Seoul (KR); KIA MOTORS CORPORATION, Seoul (KR); DH HOLDINGS CO., LTD., Ulsan (KR)

( * ) Notice: Subject to any disclaimer, the term of this patent is extended or adjusted under 35 U.S.C. 154(b) by 319 days.

(21) Appl. No.: 14/071,462

(22) Filed: Nov. 4, 2013

(65) Prior Publication Data

US 2014/0210288 A1    Jul. 31, 2014

(30) Foreign Application Priority Data

Jan. 30, 2013    (KR) .................. 10-2013-0010344

(51) Int. Cl.
| | | |
|---|---|---|
| *H02K 11/00* | (2016.01) | |
| *H02K 5/00* | (2006.01) | |
| *H02K 7/14* | (2006.01) | |
| *H02K 3/52* | (2006.01) | |
| *H02K 5/22* | (2006.01) | |

(52) U.S. Cl.
CPC ............ *H02K 11/0094* (2013.01); *H02K 11/33* (2016.01); *H02K 3/522* (2013.01); *H02K 5/225* (2013.01); *H02K 2203/03* (2013.01)

(58) Field of Classification Search
CPC ............ H02K 5/22; H02K 7/14; H02K 11/00
USPC ........... 310/40 MM, 50, 68 D, 68 R, 71, 75 R
See application file for complete search history.

(56) References Cited

U.S. PATENT DOCUMENTS

| | | | |
|---|---|---|---|
| 2006/0006750 A1* | 1/2006 | Segawa | .................... H02K 5/00 310/71 |
| 2011/0156545 A1* | 6/2011 | Wen | ........................ H02K 23/66 310/68 B |
| 2011/0316374 A1* | 12/2011 | Miyaji | ................... H02K 5/225 310/83 |

FOREIGN PATENT DOCUMENTS

| | | |
|---|---|---|
| KR | 20-0406435 Y1 | 1/2006 |
| KR | 10-2009-0074131 A | 7/2009 |
| KR | 10-0982858 B1 | 9/2010 |
| KR | 10-1180560 B1 | 9/2012 |

* cited by examiner

*Primary Examiner* — Jose Gonzalez Quinone
(74) *Attorney, Agent, or Firm* — McDemott Will & Emery LLP (57) ABSTRACT

A structure of a Brushless Direct Current (BLDC) motor includes a control board having an electric circuit therein, and a housing electrically connected to the control board. The housing includes a rotor having a permanent magnet, a stator in which a coil is wound, a protruding member protruding to one side of the housing, and a terminal electrically connected to the coil and disposed at the protruding member. The control board includes a socket electrically connected to the electric circuit and disposed at the control board. When the housing and the control board are coupled, the terminal and the socket come into contact with each other so as to be electrically connected to each other.

5 Claims, 9 Drawing Sheets

STRUCTURE OF BRUSHLESS DIRECT CURRENT MOTOR HAVING DIRECT CONNECTION BETWEEN MAIN BODY AND CONTROLLER

CROSS-REFERENCE TO RELATED APPLICATION

This application claims benefit of priority to Korean Patent Application No. 10-2013-0010344, filed on Jan. 30, 2013, in the Korean Intellectual Property Office, the entire contents of which are hereby incorporated by reference.

TECHNICAL FIELD

The present inventive concept relates to a structure of a Brushless Direct Current (BLDC) motor, and more particularly, to a structure of a BLDC motor including a main body, in which a rotor including a permanent magnet and a stator having a wound coil to which a three-phase (or four-phase) current is supplied are mounted in a housing, and a controller configured to control phases of currents applied to three-phase (or four-phase) wires, such that the main body and the controller are directly connected (without a wire connection).

BACKGROUND

A Brushless Direct Current (BLDC) motor has been developed to solve a problem of abrasion of a brush, which is a drawback of a DC motor. The BLDC motor has a structure in which a brush is not provided. Because the BLDC motor has improved speed and torque, high responsiveness and durability, and ability to control a rotating speed and a rotating direction, the BLDC motor is widely used in various fields including vehicles.

The BLDC motor basically has a structure in which a permanent magnet is mounted at a rotor and a coil is wound around a stator. The BLDC motor is configured to be operated by realizing and detecting a rotating state of the rotor through sensors such as a hall sensor or a photo diode and controlling a phase of a current applied to the coil in accordance with the rotating state of the rotor.

The BLDC motor has a structure in which an electrical angle is detected through sensors and the rotor is rotated by synchronizing a three-phase current or a four-phase current applied to the stator with a magnetic pole of the rotor in accordance with the electrical angle. Therefore, the BLDC motor is advantageous in that a rotating speed of the rotor is increased and noise is suppressed as mechanical friction does not occur. However, a controller inevitably needs to adjust the current being applied.

The controller is also required to be provided at a sensorless BLDC motor which detects an electrical angle with a current and a voltage detected at the motor without using sensors. The controller is configured by mounting electric circuits such as a decoder, a switching element, a current detector, a phase converter, or the like on a PCB board.

Figure 1:
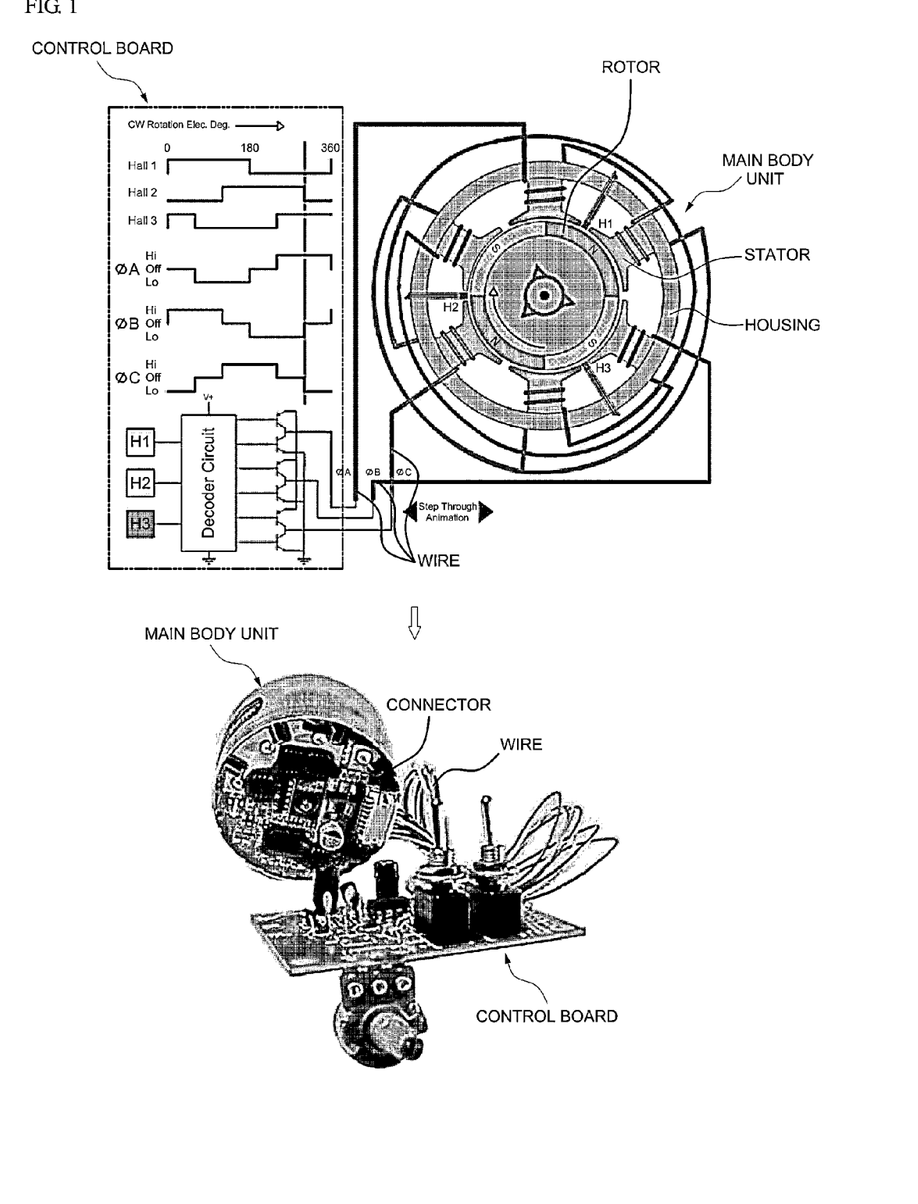
FIG. 1 is a view illustrating a photograph which shows a state in which a main body and a control board of a BLDC motor of the related art are separated (top), and a cross section of the main body (bottom).

Meanwhile, as illustrated in FIG. 1, in a structure of the related art, a control board (PCB board) and a housing of a motor main body, configured as the controller, are connected by wires having ends to which connecters are connected.

That is, in order to allow currents to flow into the coil wound around the stator to drive the rotor, three wires (four wires in a case of a four-phase motor) are needed to apply currents which have phase difference. In addition, three hall sensors, which are disposed at intervals of 120° to detect a position of the rotor, each require objects to carry out the detection. Thus, total five wires for signals including a pair of + and − additional power lines are required for the three hall sensors to be operated.

Therefore, at least eight strands of wires are required between the housing and the control board.

A structure of the related art also requires, in addition to the aforementioned wires, a pair of connectors that are mounted at ends of each of the wires to be electrically connected to the main body and the control board. Further, a process of connecting the connectors is performed by a manual work through labor. Therefore, the structure of the related art has a problem in that an additional work space is needed and process time for manufacturing and assembling processes increases. Thus, it has limitations in miniaturizing products and reducing unit costs.

SUMMARY

The present inventive concept has been made in an effort to provide a structure of a BLDC motor having advantages of achieving product miniaturization, reducing production costs, and further improving manufacturing and assembling processes.

An aspect of the present inventive concept relates to a structure of a BLDC motor, including and a control board having an electric circuit therein and a housing electrically connected the control board. The housing includes a rotor having a permanent magnet, a stator in which a coil is wound, a protruding member protruding to one side of the housing, and a terminal electrically connected to the coil and disposed at the protruding member. The control board includes a socket electrically connected to the electric circuit and disposed at the control board. When the housing and the control board are coupled, the terminal and the socket come into contact with each other so as to be electrically connected to each other.

The socket may include a first socket having a plate shape and horizontally disposed to be in parallel to a surface of the control board. The protruding member may include a first protruding member which approaches the first socket when the housing and the control board are coupled. The terminal may include a first terminal disposed at the first protruding member to be in contact with the first socket when the housing and the control board are coupled, such that the first terminal is elastically deformable when the first terminal comes into contact with the first socket.

Further, an arc-shaped curved portion may be disposed at an end of the first terminal.

In addition, the socket may include a second socket having a plate shape, vertically standing on a surface of the control board, and having a fitting hole. The protruding member may include a second protruding member having one side edge disposed in the fitting hole of the second socket when the housing and the control board are coupled. The terminal may include a second terminal disposed at one side edge of the second protruding member to be disposed in the fitting hole of the second socket when the housing and the control board are coupled.

An enlarged hole may be defined in the second socket to extend from the fitting hole such that a width of the fitting hole is elastically increased when the second terminal enters. In addition, the second terminal may be attached in a mount hole concavely recessed in the second protruding member.

In the present inventive concept having the aforementioned configuration, the protruding member is configured at the housing, the socket is mounted at the control board, and the protruding member and the socket are electrically connected to each other when the housing and the control board are coupled. Therefore, wires and connectors of the related art may be removed.

In addition, because the protruding member and the socket are configured to be electrically connected to each other at the time of physically coupling the housing and the control board, the assembling process may be shortened.

In the present inventive concept, the socket includes the first socket which is horizontally mounted at a surface of the control board and the second socket which vertically stands on the surface of the control board, and the terminal includes the first terminal which is connected to the first socket in a contact point manner and the second terminal which is in contacted with the second socket in a fitting manner. Therefore, the control board and the main body may be more easily, flexibly and electrically connected to each other in accordance with sizes and shapes of the control board and the motor main body.

BRIEF DESCRIPTION OF THE DRAWINGS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

DETAILED DESCRIPTION OF THE EMBODIMENTS

The foregoing and other features of the inventive concept will be apparent from a more particular description of embodiments of the inventive concept, as illustrated in the accompanying drawings in which like reference characters may refer to the same or similar parts throughout the different views. The drawings are not necessarily to scale, emphasis instead being placed upon illustrating the principles of the embodiments of the inventive concept.

Hereinafter, a structure of a BLDC motor according to an exemplary embodiment of the present inventive concept will be described in more detail with reference to the drawings.

Figure 2:
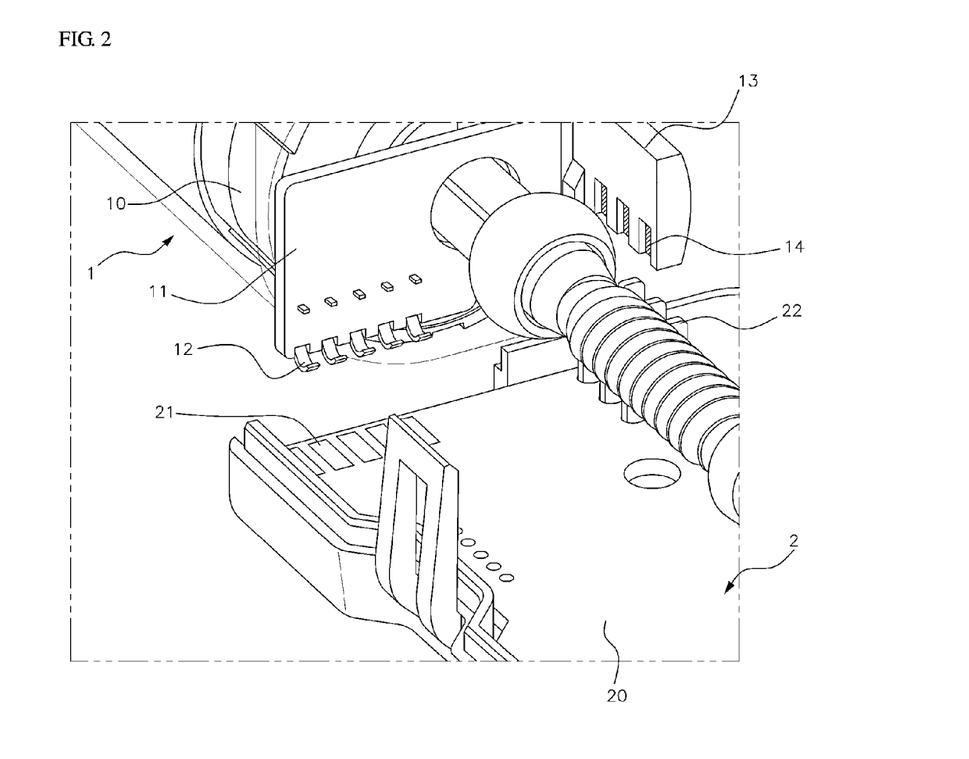
FIG. 2 is a view illustrating a state before a main body and a controller of a BLDC motor are coupled, according to an exemplary embodiment of the present inventive concept.
Figure 3:
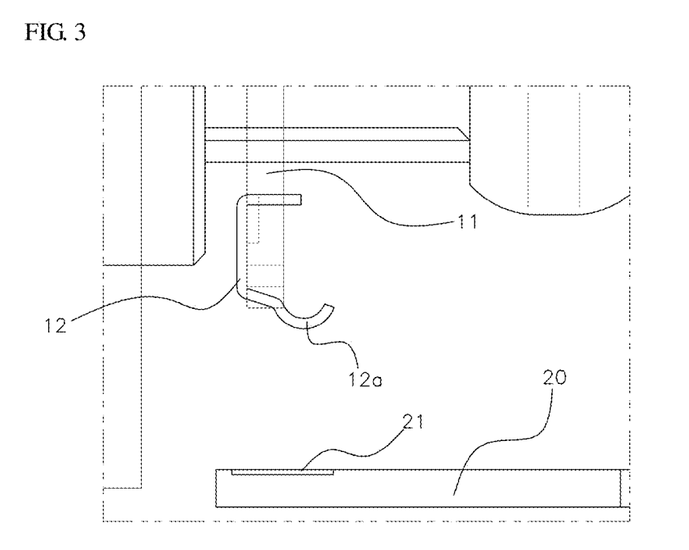
FIG. 3 is a view illustrating a state before a first terminal comes into contact with a first socket.
Figure 4:
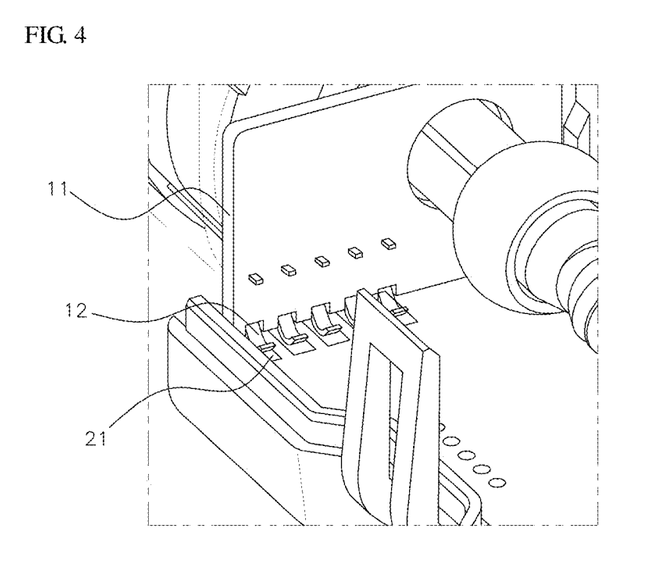
FIGS. 4 to 6 are views illustrating a state after a first terminal comes into contact with a first socket, respectively.

With reference to FIG. 2, a BLDC motor according to an exemplary embodiment of the present inventive concept may be configured by coupling a main body 1 and a controller 2. The main body 1 may include a housing 10 having therein a rotor having a permanent magnet, and a stator in which a coil is wound. The controller 2 may include a power source which supplies electric power by being applied with an external power source from the outside, and a control board 20 in which an electric circuit configured to control a current is mounted.

Meanwhile, the housing 10 may include protruding members 11 and 13 protruding to one side of the housing 10, respectively. The protruding members 11 and 13 have ends to which terminals 12 and 14, which are electrically connected to the coil, may be attached. The protruding members 11 and 13 according to an exemplary embodiment of the present inventive concept may include a hall sensor and a control device mounted therein. The protruding members 11 and 13 may additionally protrude from a PCB board coupled to the housing 10.

In an exemplary embodiment of the present inventive concept, the protruding members 11 and 13 may include a first protruding member 11, which may be disposed at the housing 10 in a lateral direction and may have the hall sensor and the control device mounted thereto, and a second protruding member 13, which may protrude from the housing 10 in a vertical direction. The terminals 12 and 14 may include a first terminal 12 attached to the first protruding member 11, and a second terminal 14 attached to the second protruding member 13.

Figure 5:
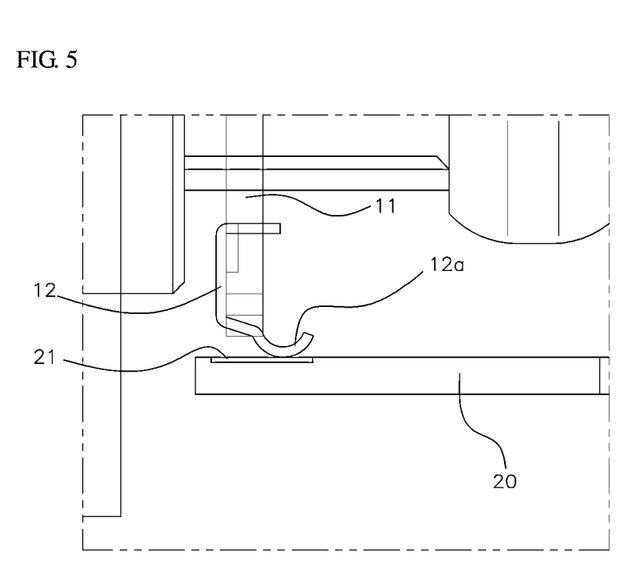
Figure 6:
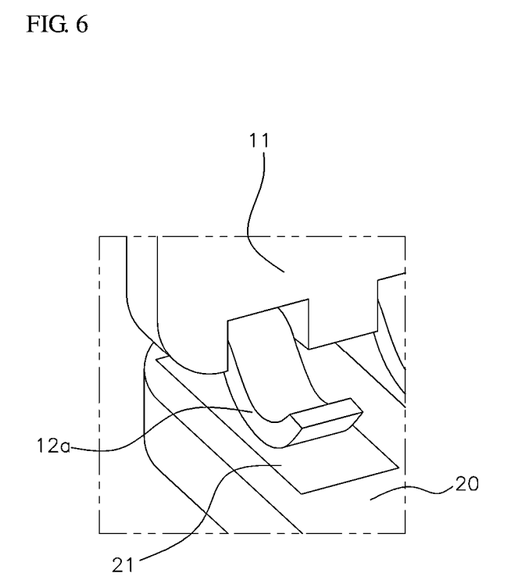
Figure 7:
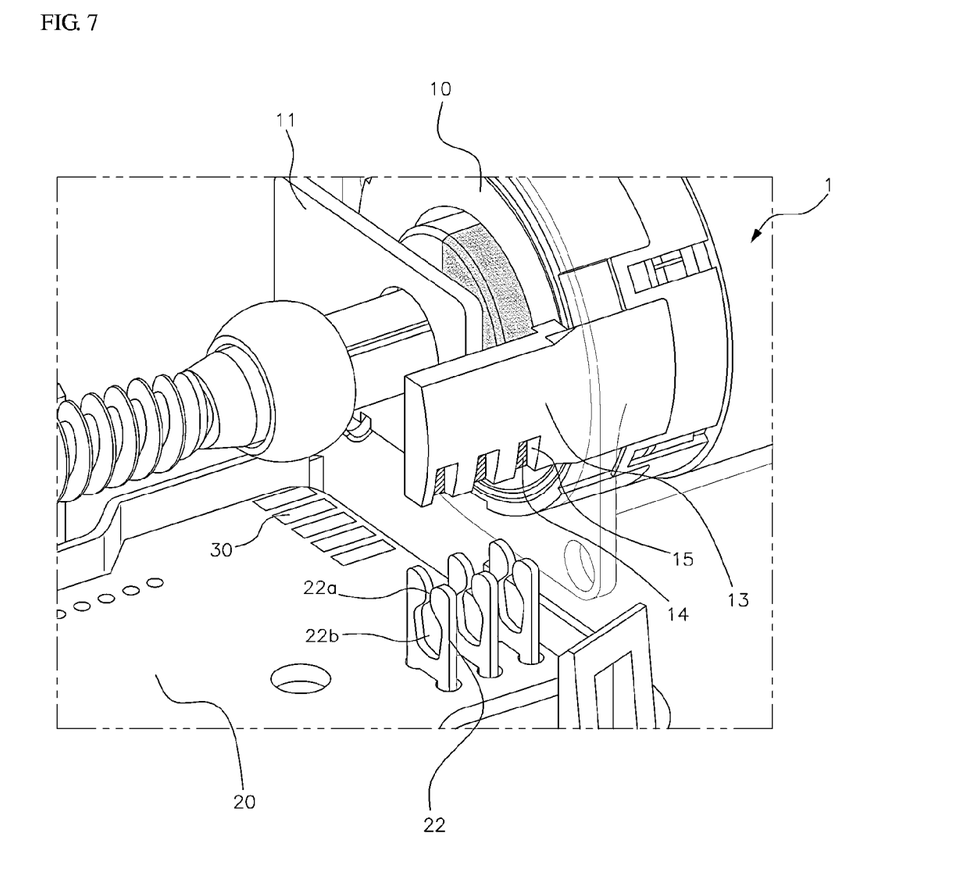
FIG. 7 is a view illustrating a state before a second terminal comes into contact with a second socket.
Figure 8:
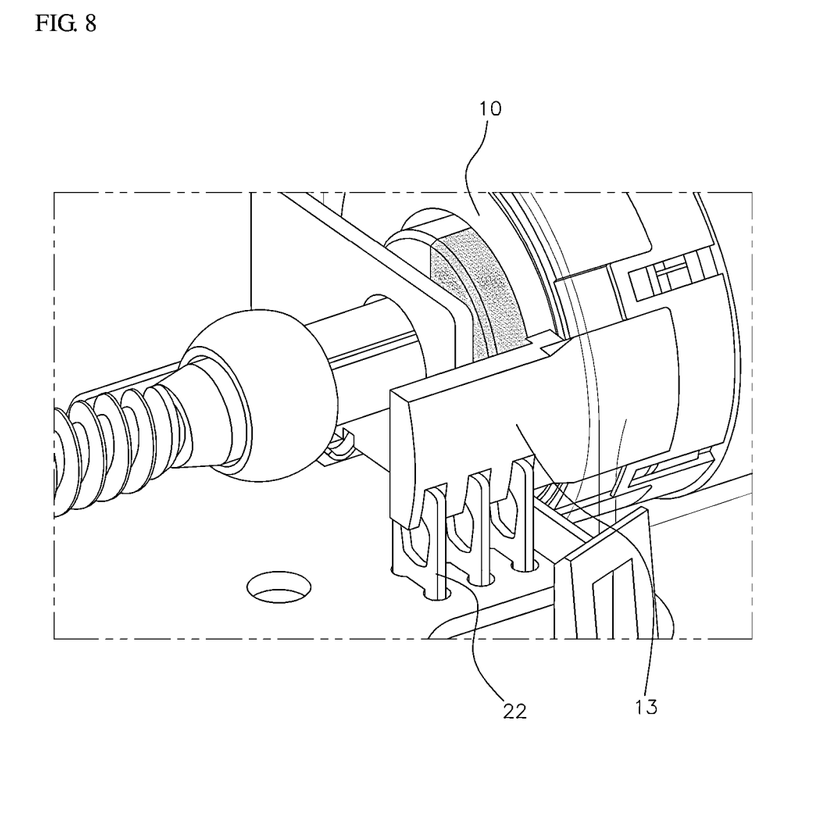
FIGS. 8 to 10 are views illustrating a state after a second terminal comes into contact with a third socket, respectively.
Figure 9:
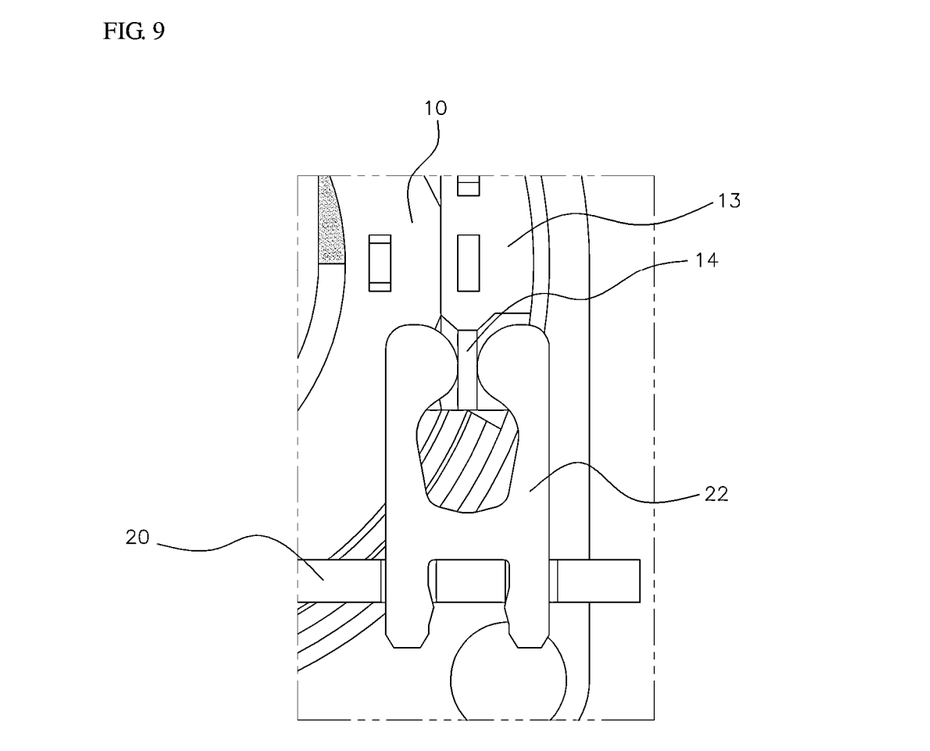
Figure 10:
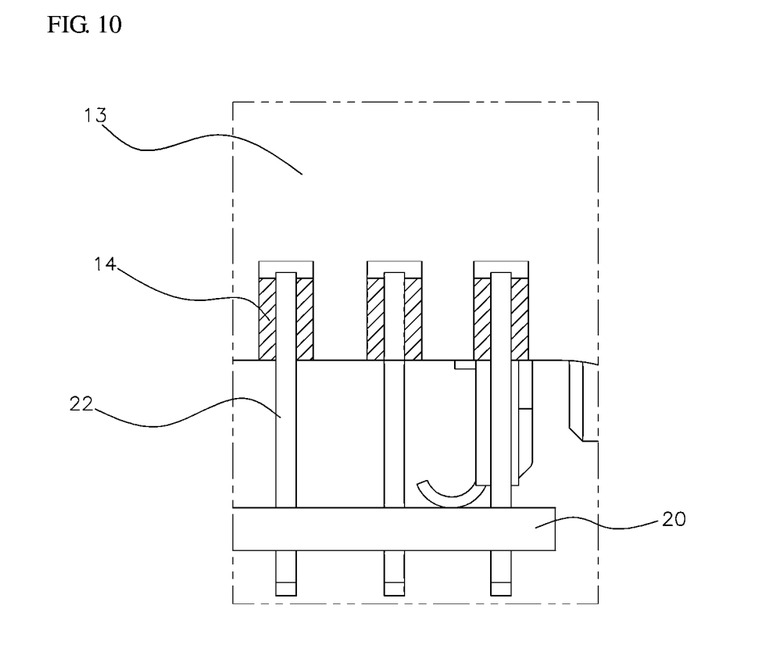

Further, sockets 21 and 22 may be electrically connected to the electric circuit, and may be mounted at the control board 20. The sockets 21 and 22 may include a first socket 21 which may come into contact with the first terminal 12 when the housing 10 and the control board 20 are coupled, and a second socket 22 which may come into contact with the second terminal 14. That is, when the housing 10 and the control board 20 are coupled (see FIG. 5), the first terminal 12 and the second terminal 14 may come into contact with the first socket 21 and the second socket 22 so as to be electrically connected to each other, respectively.

As more apparently illustrated in FIGS. 2 to 6, the first socket 21 may have a plate shape and be horizontally mounted to be parallel to a surface of the control board 20. The first terminal 12 may be mounted at a lower end of the housing 10 so as to be in contact with the first socket 21 when the control board 20 is coupled to a lower side of the housing 10 (see FIG. 5).

The first terminal 12 mounted at the first protruding member 11 may be elastically deformed when coming into contact with the first socket 21 so that reliability of the electrical connection may be secured. An arc-shaped curved portion 12a (see FIGS. 3, 5 and 6) may be formed at an end of the first terminal 12 to induce the aforementioned elastic deformation. For example, the first socket 21 may be mounted below a surface of the control board 20 in a portion in which a groove is concavely formed so as to prevent the first terminal 12 from being moved away from the first socket 21 when the first terminal 12 is in contact with the first socket 21.

Meanwhile, as more apparently illustrated in FIGS. 7 to 10, the second socket 22 may have a plate shape, and may vertically stand on the surface of the control board 20. A fitting hole 22a may be formed at an upper end of the second socket 22. The second terminal 14 may be mounted at a lower edge of the second protruding member 13 so as to be inserted into the fitting hole 22a of the second socket 22 when the housing 10 and the control board 20 are coupled. An enlarged hole 22b may be formed in the second socket 22 to be extended from the fitting hole 22a so that a width of the fitting hole 22a may be elastically increased when the second terminal 14 enters. Further, the second terminal 14 may be attached in a mount hole 15, which may be concavely recessed in the second protruding member 13, so that the second terminal 14 may not be moved away from the fitting hole 22a.

Because the BLDC motor according to an exemplary embodiment of the present inventive concept, which is configured as described above, does not use an separate wire to be connected to a rotor and/or a sensor when the main body 1 and the controller 2 are connected, and has a contact point connection type, the control board 20 and the main body 1 may be integrally assembled. Further, because the protruding member may be configured in a hall sensor PCB, which would be mounted in a structure of the related art, production costs may be more reduced.

In addition, the second terminal 14 and the second socket 22 may be assembled in a one touch manner, and naturally come into contact with each other when the housing 10 and the control board 20 are assembled, thereby more simplifying an assembling method.

The present inventive concept having the aforementioned configuration, in comparison with a structure of the related art, may remove a separate process of assembling connectors, may achieve convenience of assembly because of the electrical connection in a contact point manner, may suppress malfunction in operation due to a defect in soldering wires, and may prevent omission due to a manual work process or wrong wire connection.

Although the present inventive concept was described with reference to limited exemplary embodiments and drawings, the present inventive concept is not limited thereto and may be changed and modified in various ways within the spirit of the present inventive concept and claims described below by those skilled in the art.

What is claimed is:

1. A structure of a Brushless Direct Current (BLDC) motor, comprising:
   a control board having an electric circuit therein; and
   a housing electrically connected to the control board, wherein:
      the housing includes:
         a rotor having a permanent magnet,
         a stator in which a coil is wound,
         a protruding member protruding to one side of the housing, and
         a terminal electrically connected to the coil and disposed at the protruding member,
      the control board includes a socket electrically connected to the electric circuit and disposed at the control board,
      when the housing and the control board are coupled, the terminal and the socket come into contact with each other so as to be electrically connected to each other,
   wherein the socket includes a second socket having a plate shape, vertically standing on a surface of the control board, and having a fitting hole;
   the protruding member includes a second protruding member having one side edge disposed in the fitting hole of the second socket when the housing and the control board are coupled; and
   the terminal includes a second terminal disposed at one side edge of the second protruding member to be disposed in the fitting hole of the second socket when the housing and the control board are coupled.

2. The structure of claim 1, wherein:
   the socket includes a first socket having a plate shape and horizontally disposed to be in parallel to a surface of the control board,
   the protruding member includes a first protruding member which approaches the first socket when the housing and the control board are coupled, and
   the terminal includes a first terminal disposed at the first protruding member to be in contact with the first socket when the housing and the control board are coupled, such that the first terminal is elastically deformable when the first terminal comes into contact with the first socket.

3. The structure of claim 2, wherein an arc-shaped curved portion is disposed at an end of the first terminal.

4. The structure of claim 1, wherein an enlarged hole is defined in the second socket to extend from the fitting hole such that a width of the fitting hole is elastically increased when the second terminal enters.

5. The structure of claim 1, wherein the second terminal is attached in a mount hole concavely recessed in the second protruding member.

* * * * *